(12) United States Patent
Tsung et al.

(10) Patent No.: US 7,987,752 B2
(45) Date of Patent: Aug. 2, 2011

(54) SYSTEM AND METHOD FOR DELIVERING PRESSURIZED FLUID TO A ROTARY CUTTING BLADE

(75) Inventors: Shawn Tsung, Monterey Park, CA (US); Rocci Merlo, Long Beach, CA (US); John E. Yenny, Monrovia, CA (US)

(73) Assignee: MK Diamond Products, Inc., Torrance, CA (US)

(*) Notice: Subject to any disclaimer, the term of this patent is extended or adjusted under 35 U.S.C. 154(b) by 163 days.

(21) Appl. No.: 12/050,758

(22) Filed: Mar. 18, 2008

(65) Prior Publication Data
US 2009/0235792 A1    Sep. 24, 2009

(51) Int. Cl.
B27B 5/29    (2006.01)

(52) U.S. Cl. ............. 83/169; 83/471.3; 125/15; 125/35; 451/455

(58) Field of Classification Search ............. 83/169, 83/471.3; 125/13.01, 15, 35; 451/450, 451, 451/454, 455; 409/134, 135
See application file for complete search history.

(56) References Cited

U.S. PATENT DOCUMENTS

| | | | |
|---|---|---|---|
| 2,014,229 A | | 9/1935 | Emmons |
| 2,464,117 A | | 3/1949 | Coates |
| 2,499,582 A | * | 3/1950 | Harrison ................. 451/456 |
| 3,022,694 A | * | 2/1962 | Nuss ........................ 83/169 |
| 3,123,951 A | * | 3/1964 | Kuris et al. .............. 451/444 |
| 3,127,886 A | * | 4/1964 | Miller .................... 125/13.01 |
| 3,816,875 A | * | 6/1974 | Duncan et al. ........... 452/149 |
| 4,041,928 A | | 8/1977 | Robinson |
| 4,280,472 A | | 7/1981 | Cochran |
| 4,443,139 A | * | 4/1984 | Eash ............................ 408/14 |
| 4,484,417 A | * | 11/1984 | Klingerman ................. 451/53 |
| 4,543,021 A | * | 9/1985 | Adler .......................... 409/134 |
| 4,574,817 A | * | 3/1986 | Suzuki et al. ............... 131/94 |
| 4,813,319 A | * | 3/1989 | Weyand, Jr. ................. 83/22 |
| 4,910,925 A | * | 3/1990 | Longuet et al. .......... 451/455 |
| 5,140,780 A | * | 8/1992 | Lincoln .................... 451/444 |
| 5,678,466 A | * | 10/1997 | Wahl ........................... 83/168 |
| 5,746,193 A | | 5/1998 | Swan |
| 5,826,478 A | * | 10/1998 | Zerrer ......................... 83/169 |
| 5,839,335 A | * | 11/1998 | Tilley ......................... 83/169 |
| 6,176,656 B1 | * | 1/2001 | Seong ........................ 409/134 |
| 6,591,826 B1 | * | 7/2003 | Donnerdal ............. 125/13.01 |
| 7,201,162 B2 | * | 4/2007 | Lee ........................ 125/13.01 |
| 7,328,639 B2 | * | 2/2008 | Sheddy et al. ............. 83/171 |
| 7,520,799 B2 | * | 4/2009 | Wedel et al. .............. 451/450 |
| 2005/0081690 A1 | * | 4/2005 | Biro .............................. 83/168 |
| 2005/0126363 A1 | | 6/2005 | Sheddy et al. |

* cited by examiner

*Primary Examiner* — Edward Landrum
(74) *Attorney, Agent, or Firm* — McAndrews, Held & Malloy, Ltd.

(57) ABSTRACT

Certain embodiments of the present technology provide systems and methods for delivering pressurized fluid to a rotary cutting blade. For example, in certain embodiments, a system for delivering pressurized fluid to a rotary cutting blade includes: a pump configured to receive fluid from a fluid source and pressurize the fluid; and a nozzle configured to receive pressurized fluid from the pump and deliver the pressurized fluid to a rotary cutting blade as an atomized fluid stream, wherein the pump pressurizes the fluid to a pressure sufficient to cause the fluid to be atomized when the fluid is passed through the nozzle. For example, in certain embodiments, a method for delivering pressurized fluid to a rotary cutting blade includes: delivering fluid to a pump; pressurizing the fluid using the pump; and delivering the pressurized fluid to a rotary cutting blade through a nozzle as an atomized fluid stream.

13 Claims, 8 Drawing Sheets

SYSTEM AND METHOD FOR DELIVERING PRESSURIZED FLUID TO A ROTARY CUTTING BLADE

BACKGROUND OF THE INVENTION

Embodiments of the present technology generally relate to systems and methods for reducing dust produced in connection with rotary cutting operations. More particularly, embodiments of the present technology provide systems and methods for delivering pressurized fluid to a rotary cutting blade, which systems and methods reduce dust without creating excessive amounts of waste material.

Rotary blades are used in connection with cutting operations. When cutting masonry, concrete materials and/or tile, diamond tipped rotary blades have been found to be effective. However, during such cutting operations, silica dust is produced. Inhaling this dust has been deemed dangerous. Reducing the amount of dust produced in connection with cutting operations is, therefore, desirable.

One method of controlling the amount of dust produced in connection with a rotary cutting operation includes flooding the cutting blade with relatively large quantities of water. The water mixes with the material that would have been dust and, therefore, reduces the amount of dust that is produced by the cutting operation. Because known operations use relatively large quantities of water, for example, 10 gallons per day in some instances, the water is recirculated through the system and reused. However, such operations result in water of high acidity that is considered hazardous. This water must be disposed of appropriately and can stain the material being cut, which is not desirable. Existing methods of controlling the amount of dust produced in connection with a rotary cutting operation that include flooding the cutting blade with relatively large quantities of water, therefore, have limited desirability.

Some patent references that relate to introducing fluid during a rotary cutting operation include, for example:

United States Patent Application Publication No. 2005/0126363, which was filed by Sheddy et al. and published on Jun. 16, 2005;

U.S. Pat. No. 5,826,478, which issued to Zerrer on Oct. 27, 1998;

U.S. Pat. No. 4,280,472, which issued to Cochran on Jul. 28, 1981;

U.S. Pat. No. 4,041,928, which issued to Robinson on Aug. 16, 1977;

U.S. Pat. No. 2,464,117, which issued to Coates on Mar. 8, 1949; and

U.S. Pat. No. 2,014,229, which issued to Emmons on Sep. 10, 1935.

Another method of controlling the amount of dust produced in connection with a rotary cutting operation includes the use of a vacuum system. However, due to the use of hoses and a debris collection unit in connection with vacuum systems, such systems tend to take up more space than systems that do not employ a vacuum. Further, filters used in vacuum systems must be replaced frequently in order to maintain proper functioning of the system. Existing methods of controlling the amount of dust produced in connection with rotary cutting operations that include the use of vacuum systems, therefore, have limited desirability.

There is, therefore, a need for improved systems and methods for reducing dust produced in connection with rotary cutting operations without creating excessive amounts of waste material, thereby reducing environmental hazards and improving operator safety.

SUMMARY OF THE INVENTION

Certain embodiments of the present technology provide systems and methods for delivering pressurized fluid to a rotary cutting blade.

For example, in certain embodiments, a system for delivering pressurized fluid to a rotary cutting blade includes: a pump configured to receive fluid from a fluid source and pressurize the fluid; and a nozzle configured to receive pressurized fluid from the pump and deliver the pressurized fluid to a rotary cutting blade as an atomized fluid stream, wherein the pump pressurizes the fluid to a pressure sufficient to cause the fluid to be atomized when the fluid is passed through the nozzle.

For example, in certain embodiments, a system for delivering pressurized fluid to a rotary cutting blade also includes: a curtain comprising a first side with a plurality of protrusions extending therefrom, wherein the curtain is disposed on a cutting apparatus such that the first side faces a cutting area.

For example, in certain embodiments, a system for delivering pressurized fluid to a rotary cutting blade also includes: a filter disposed between the pump and the nozzle, wherein the filter is configured to stop particulate matter from entering the nozzle.

For example, in certain embodiments, a system for delivering pressurized fluid to a rotary cutting blade also includes: a switch operably connected to the pump, wherein the switch has a first position and a second position, wherein the pressurized fluid is delivered to the nozzle when the switch is in the first position and the pressurized fluid is not delivered to the nozzle when the switch is in the second position.

For example, in certain embodiments, a method for delivering pressurized fluid to a rotary cutting blade includes: delivering fluid to a pump; pressurizing the fluid using the pump; and delivering the pressurized fluid to a rotary cutting blade through a nozzle as an atomized fluid stream, wherein the pump pressurizes the fluid to a pressure sufficient to cause the fluid to be atomized when the fluid is passed through the nozzle.

For example, in certain embodiments, a method for delivering pressurized fluid to a rotary cutting blade also includes: containing fluid delivered through the nozzle and dust created during a cutting operation by disposing a curtain with a plurality of protrusions extending therefrom adjacent to the cutting operation.

For example, in certain embodiments, a method for delivering pressurized fluid to a rotary cutting blade also includes: filtering particulate matter from the pressurized fluid before delivering the pressurized fluid to the nozzle.

For example, in certain embodiments, a method for delivering pressurized fluid to a rotary cutting blade also includes: delivering the pressurized fluid to the blade when a switch operably connected to the pump is in a first position; and not delivering the pressurized fluid to the blade when the switch is in a second position.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Below is a detailed description of embodiments depicted in FIGS. 1-9. In the figures, like elements are identified with like numbers.

Figure 1:
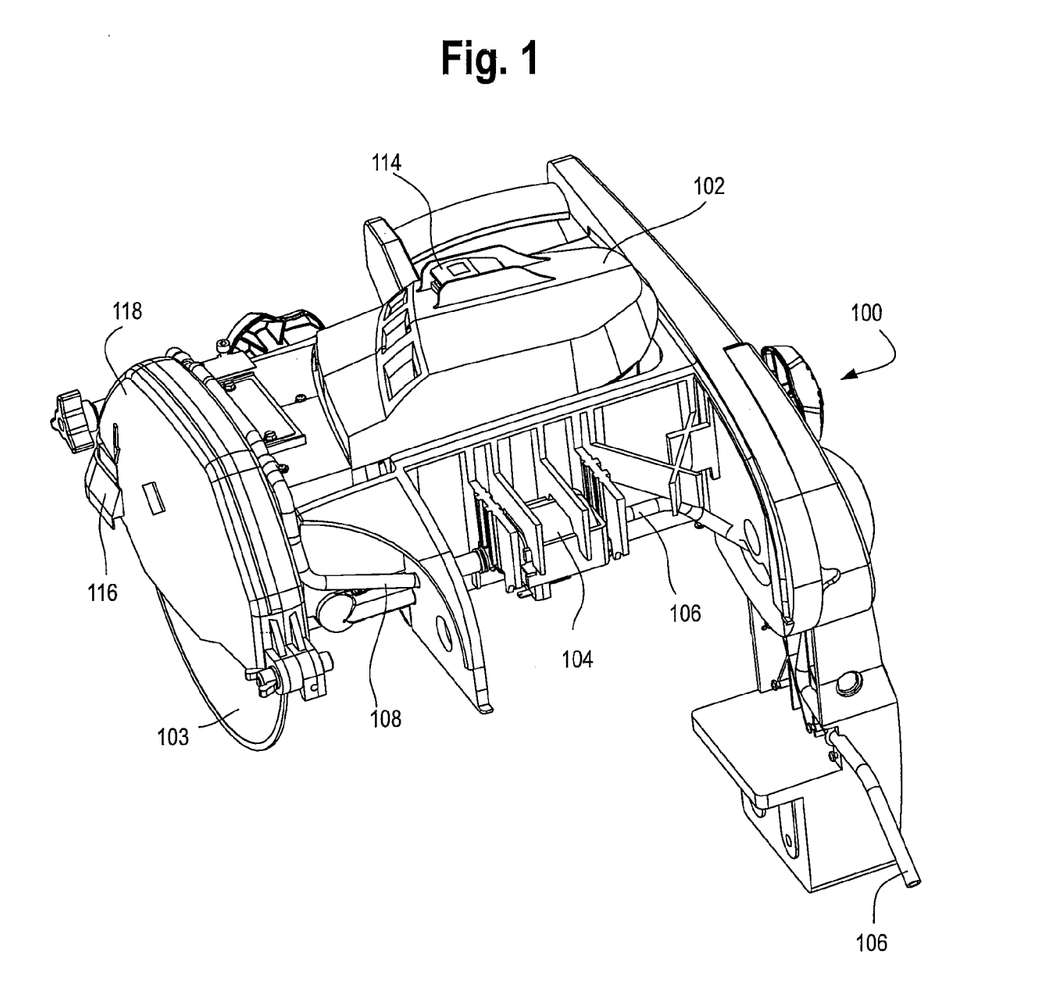
FIG. 1 is a rear-side perspective view of a saw arm used in accordance with an embodiment of the present technology.
Figure 2:
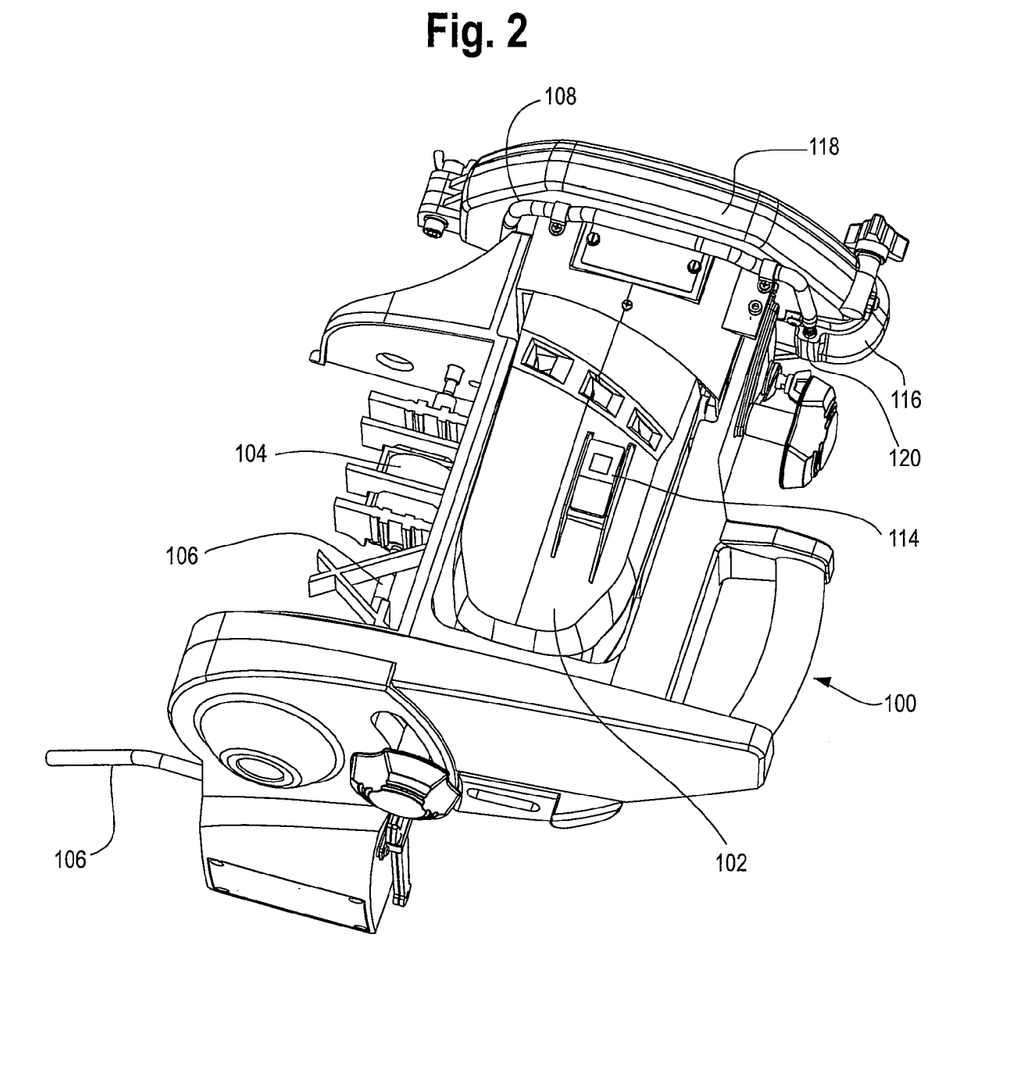
FIG. 2 is a front-side perspective view of a saw arm used in accordance with an embodiment of the present technology.
Figure 3A:
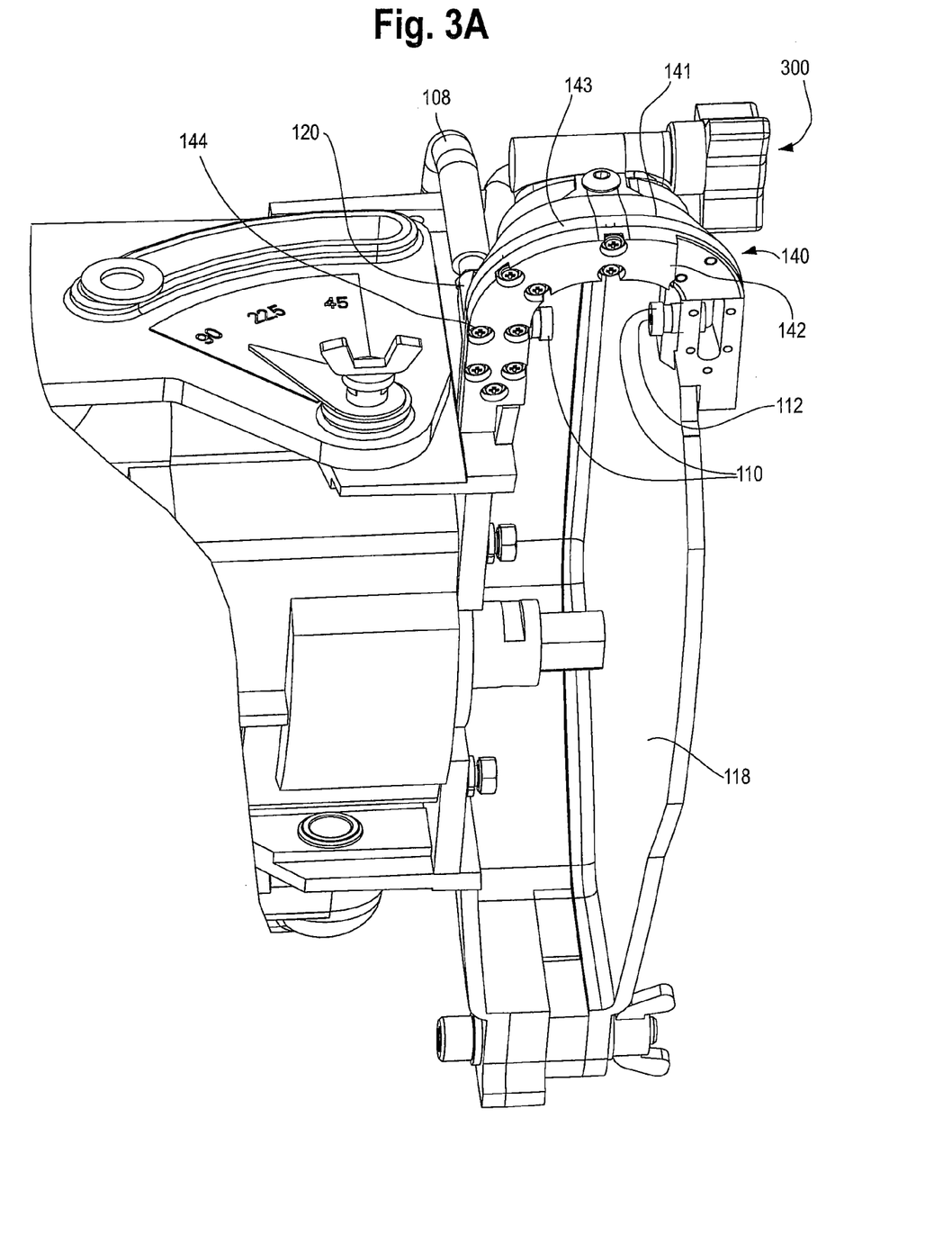
FIG. 3A is a bottom-side perspective view of a portion of a saw arm used in accordance with an embodiment of the present technology.
Figure 3B:
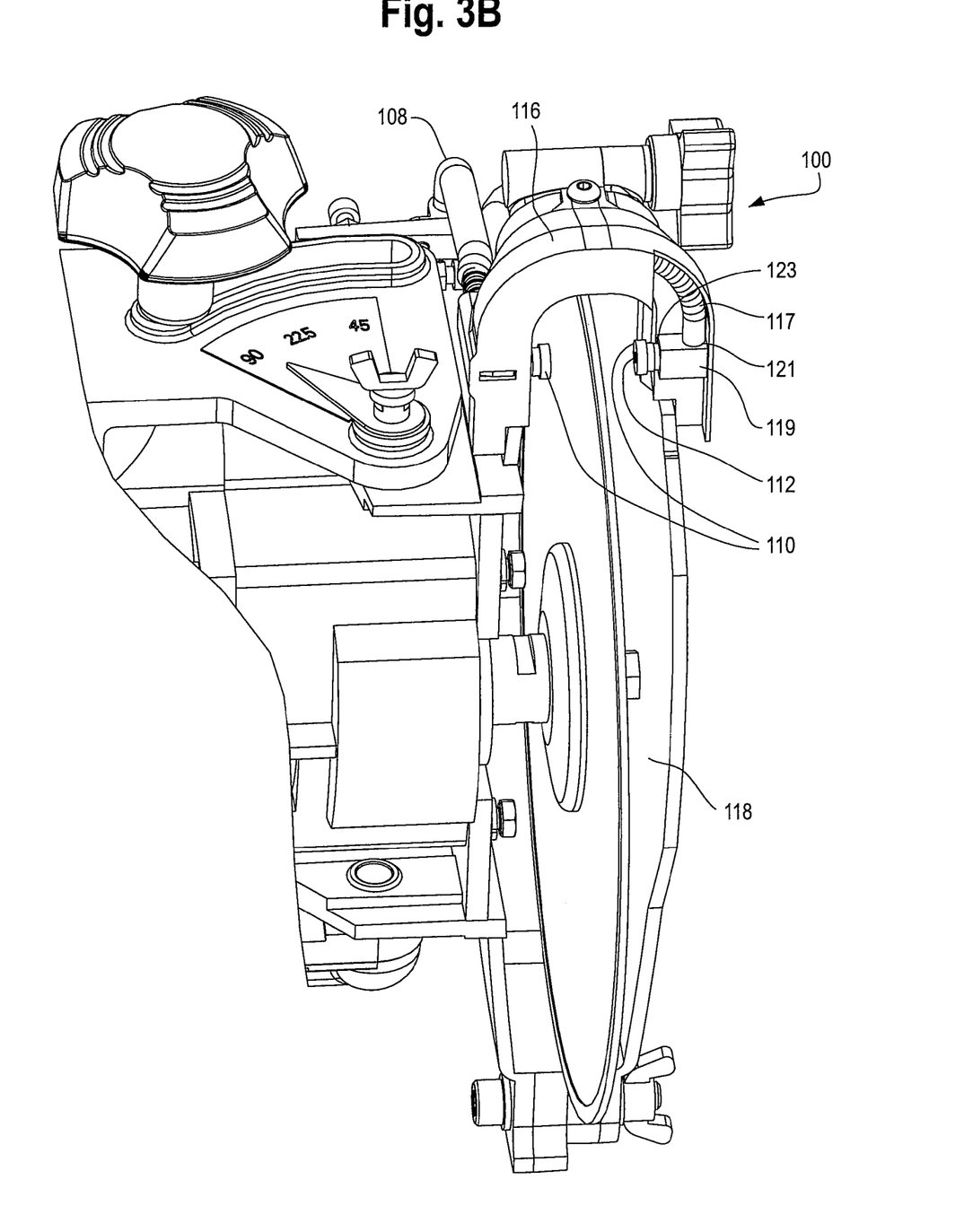
FIG. 3B is a bottom-side perspective view of a portion of a saw arm used in accordance with an embodiment of the present technology.

FIGS. 1-2 and 3B show a saw arm 100 used in accordance with an embodiment of the present technology. The saw arm 100 includes a motor housing 102 that houses a motor (not shown) operably connected to a saw blade 103 such that rotation of the blade 103 is driven by the motor. Attached to the saw arm 100 is a pump 104. The pump 104 includes a fluid inlet (not shown) through which fluid can be delivered to the pump 104 and a fluid outlet (not shown) through which pressurized fluid can be delivered from the pump 104. Fluid can be delivered to the pump 104 through the fluid inlet by a fluid conduit 106, such as a tube, for example. The fluid conduit 106 can be configured to receive fluid from a fluid source (such as the fluid source 702 shown in FIG. 7, for example). The pump 104 can pressurize fluid to a desired pressure. Pressurized fluid can be delivered from the pump 104 through the fluid outlet by a fluid conduit 108, such as a tube, for example. The fluid conduit 108 can be configured to deliver fluid to a nozzle 110 (shown in FIG. 3B). Nozzle 110 can deliver fluid through an opening 112 (shown in FIG. 3B) to contact a blade 103.

In certain embodiments, the saw blade 103 can be a diamond tipped blade for cutting masonry, concrete materials and/or tile. In certain embodiments, the blade 103 can be a different type of blade for cutting other materials.

In operation, the fluid can be pressurized by the pump 104 to a pressure sufficient to cause the fluid to be atomized when the fluid is passed through the nozzle 110. An atomized fluid stream can resemble a mist. The atomized fluid stream can knock down and/or mix with dust particles, thereby reducing the amount of dust particles that escape the cutting area. Atomized fluid streams can produce 1-5 gallons of fluid per hour, as opposed to unrestricted fluid streams, which can produce 120-180 gallons of fluid per hour. It has been found that using an atomized fluid stream during cutting operations, as opposed to an unrestricted fluid stream, can in some instances reduce the amount of fluid used from 10 gallons per day to 1 gallon per day.

As discussed above, rotation of the blade 103 is driven by the motor. For example, when power is supplied to the motor, the motor can cause the blade 103 to rotate. Power to the motor can be controlled by a switch 114. The switch 114 can have an on position and an off position, such that power is supplied to the motor when the switch 114 is in the on position and power is not supplied to the motor when the switch 114 is in the off position.

As also discussed above, delivery of pressurized fluid to the blade 103 is controlled by the pump 104. For example, when power is supplied to the pump 104, the pump 104 can cause pressurized fluid to be delivered to the blade 103, and when power is not supplied to the pump 104, the pump 104 does not cause pressurized fluid to be delivered to the blade 103. In certain embodiments, power to the pump 104 can be controlled by the switch 114, such that power is supplied to the pump 104 when the switch 114 is in the on position and power is not supplied to the pump 104 when the switch 114 is in the off position.

In certain embodiments, the pump 104 can be, for example, a Flojet® ET 508 Series Industrial Oscillating Pump with ¼ inch barb ports and a bypass pressure of 55 pounds per square inch. In such embodiments, the fluid conduit 106 that delivers fluid to the pump's fluid inlet and the fluid conduit 108 that receives fluid from the pump's fluid outlet can be ¼ inch in diameter. In such embodiments, the pump can pressurize the fluid to 55 pounds per square inch. In certain embodiments, the pump 104 can be a different type of pump. In certain embodiments, the pump 104 can have different size ports and be used with fluid conduits 106, 108 that have different diameters. In certain embodiments, the pump 104 can pressurize fluid to a different pressure.

In certain embodiments, the fluid source can be, for example, a tank or a reservoir. In certain embodiments, a fluid source can be, for example, a two gallon tank or a tank of a different size. In certain embodiments, the fluid source can be, for example, a water spicket. In certain embodiments, a fluid source can contain, for example, water. In certain embodiments, a fluid source can contain any other fluid that is suitable for dust containment and/or blade cooling.

As discussed above, pressurized fluid can be delivered from the pump 104 to a nozzle 110 via a fluid conduit 108. In certain embodiments, the fluid conduit 108 can be configured to deliver fluid to another fluid conduit that delivers fluid to a nozzle or a plurality of nozzles. In certain embodiments, the fluid conduit 108 can be configured to deliver fluid to a manifold that delivers fluid to a nozzle or a plurality of nozzles, for example. In certain embodiments, the fluid conduit 108 can be configured to deliver fluid to tube that delivers fluid to a nozzle or a plurality of nozzles, for example.

FIG. 3A is a bottom-side perspective view of a portion of a saw arm 300 used in accordance with an embodiment of the present technology. In the embodiment shown in FIG. 3A, nozzle 110 can be retained in manifold 140 disposed on a blade housing 118. In such embodiments, the fluid conduit 108 can be configured to deliver fluid to nozzle 110 via the manifold 140. In the embodiment shown in FIG. 3A, the manifold 140 is a u-shaped manifold disposed on the blade housing 118 about a narrow end of the blade housing 118. In this embodiment, manifold 140 receives fluid from the fluid conduit 108 at a manifold inlet 120. Fluid is then circulated through the manifold 140 to two nozzles 110 that are attached to the manifold 140. Nozzles 110 that are attached to the manifold 140 can deliver fluid through a nozzle opening 112 to contact a blade. In the embodiment shown in FIG. 3A, the manifold 140 includes an upper portion 141, a lower portion 142, and a gasket 143 therebetween. Screws 144 attach the lower portion 142 to the upper portion 141.

FIG. 3B is a bottom-side perspective view of a portion of a saw arm 100 used in accordance with an embodiment of the present technology. In the embodiment shown in FIG. 3B, nozzle 110 can be retained in elbow fitting 119. In such embodiments, the fluid conduit 108 can be configured to deliver fluid to nozzle 110 via a fluid conduit, such as tube 117, for example, that is configured to deliver fluid to elbow fitting 119. In the embodiment shown in FIG. 3B, the elbow fitting 119 is a ninety degree elbow that receives fluid at inlet 121 from tube 117, and retains nozzle 110 at end 123, thereby delivering fluid to nozzle 110. The elbow fitting 119 can be attached to cover 116, for example, by snapping elbow fitting 119 into notches (not shown) in cover 116. Cover 116 can be u-shaped and can be disposed on blade housing 118 about a narrow end of blade housing 118, for example by using screws to attach cover 116 to blade housing 118. Nozzles 110 that are attached to elbow fittings 119 can deliver fluid through a nozzle opening 112 to contact a blade.

In certain embodiments, nozzle 110 can have a threaded end 122 (shown in FIGS. 5 and 6) and the nozzle receiving element, such as a manifold or elbow fitting, for example, can be configured to matingly receive the threaded end 122 of nozzle 110. Nozzle 110 can be secured to the nozzle receiving element by screwing the threaded end 122 of nozzle 110 into the matingly configured portion of the nozzle receiving element. Likewise, nozzle 110 can be unsecured from the nozzle receiving element by unscrewing the threaded end 122 of nozzle 110 from the matingly configured portion of the nozzle receiving element. This can allow nozzle 110 to be removable and replaceable. In certain embodiments, the blade housing can be configured to matingly receive the threaded end 122 of nozzle 110. In such embodiments, nozzle 110 can be removably attached to the blade housing.

Figure 5:
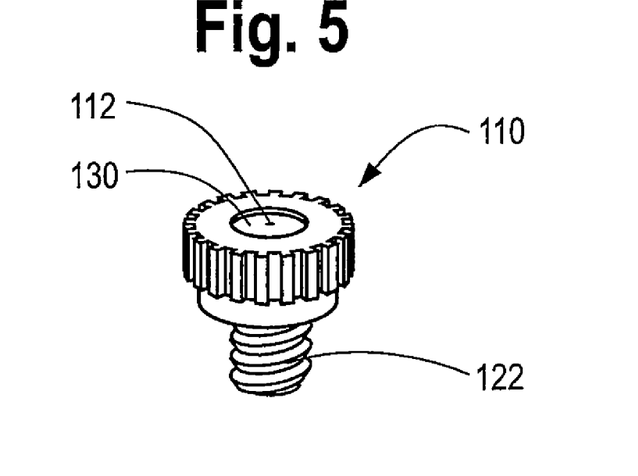
FIG. 5 is a top-side perspective view of a nozzle used in accordance with an embodiment of the present technology.
Figure 6:
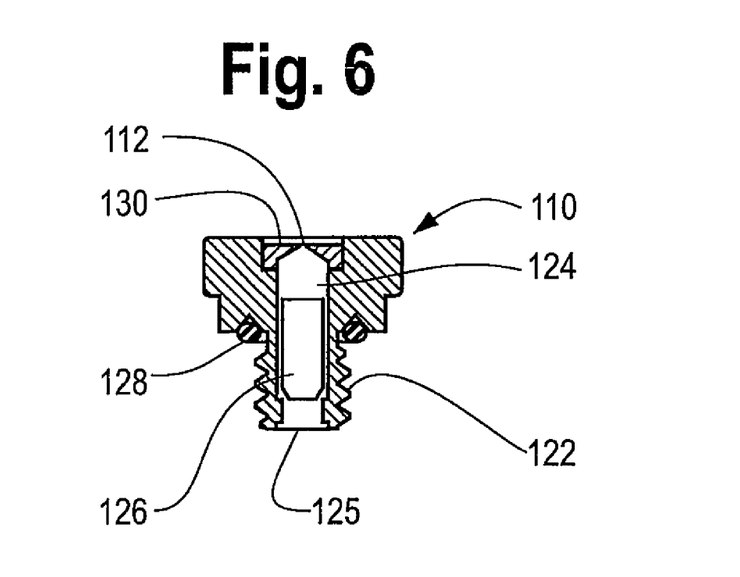
FIG. 6 is a side sectional view of a nozzle used in accordance with an embodiment of the present technology.

FIGS. 5 and 6 show a nozzle 110 used in accordance with an embodiment of the present technology. The nozzle 110 includes a threaded end 122 that can be used to secure the nozzle 110 to a anything that is configured to matingly receive the threaded end 122. The nozzle 110 also includes an internal chamber 124 with a first opening 125 through which fluid can be received and a second opening 112 through which fluid can be delivered. Inside the internal chamber 124 is an insert 126. When fluid enters the internal chamber 124 through the first opening 125, the insert 126 moves toward the second opening 112 of the internal chamber 124 until the insert 126 contacts stop 130. Stop 130 can contain insert 126 inside the internal chamber 124 while allowing fluid to pass through the second opening 112 of the internal chamber 124. The nozzle 110 also includes an o-ring 128 disposed around the threaded end 122. The o-ring 128 can form a seal between the nozzle and the periphery of an object to which the nozzle 110 is secured.

In certain embodiments, nozzle 110 can be, for example, made of brass. In certain embodiments, insert 126 can be, for example, made of steel. In certain embodiments, o-ring 128 can be, for example, made of rubber. In certain embodiments, nozzle 110, insert 126 and o-ring 128 can be made of other suitable materials.

In certain embodiments, internal chamber 124 can have a second opening 112 that is, for example, 0.006, 0.008, 0.010, 0.012, 0.014, 0.016, 0.018 or 0.020 inches in diameter. In certain embodiments, internal chamber 124 can have a second opening 112 that is, for example, between about 0.006 and about 0.020 inches in diameter. In certain embodiments, using a nozzle 110 with a second opening 112 with a diameter above in connection with a pump configured to pressurize the fluid to a sufficient pressure can provide an amount of atomized fluid to the blade 103 that is sufficient to provide dust containment without excessively flooding the work area with fluid.

In certain embodiments, a filter (not shown) can be used to stop particulate matter from entering nozzle 110. In certain embodiments, a filter can be, for example, located between a fluid conduit 108 that supplies pressurized fluid to a nozzle 110 and the nozzle 110. In certain embodiments, a filter can be, for example, located between a fluid conduit 108 that supplies pressurized fluid and a manifold inlet 120 on a manifold 140 that directs fluid to a nozzle 110. In certain embodiments, a filter can be, for example, located between a fluid conduit 108 that supplies pressurized fluid and a tube 117 that directs fluid to a nozzle 110. In certain embodiments, a filter can be configured to stop particulate matter with a diameter greater than 0.0036 inches from entering nozzle 110. In certain embodiments, a filter can be configured to stop particulate matter with a different diameter from entering nozzle 110. In certain embodiments, a filter can include a screen or a piece of semi-permeable material that can stop particulate matter from passing therethrough while allowing fluid to pass therethrough.

In certain embodiments, such as the embodiments shown in FIGS. 3A and 3B, for example nozzles 110 can be configured such that fluid delivered through the nozzles 110 is delivered in a direction that is substantially perpendicular to the plane of rotation of a blade. In certain embodiments, a nozzle can be configured such that fluid delivered through the nozzle is delivered in a direction that is not substantially perpendicular to the plane of rotation of a blade.

Figure 4:
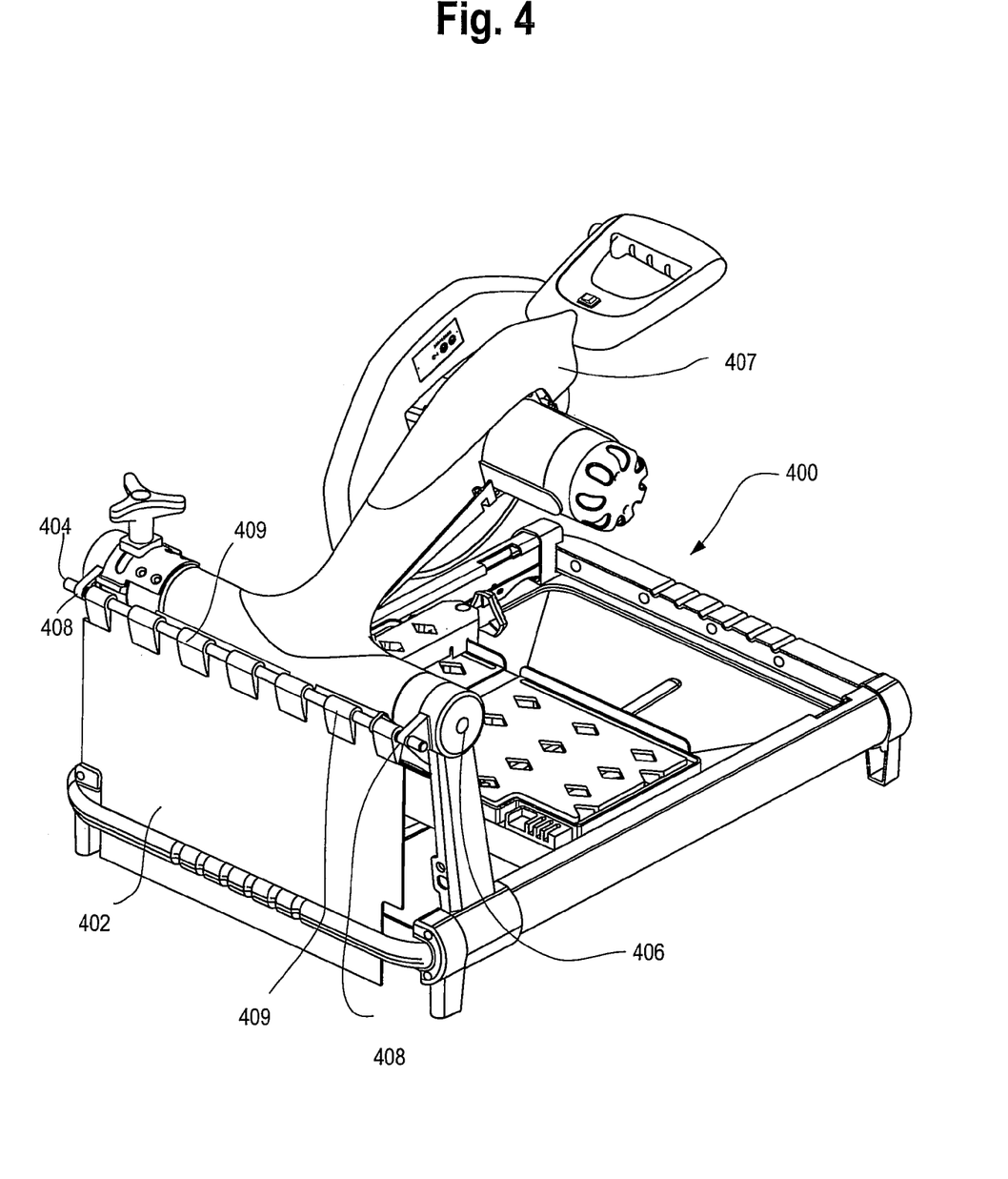
FIG. 4 is a rear-side perspective view of a saw used in accordance with an embodiment of the present technology.

FIG. 4 is a rear-side perspective view of a saw 400 used in accordance with an embodiment of the present technology. The saw includes a curtain 402 disposed from a rod 404 that is attached to the saw 400 using brackets 408 near the pivotal axis 406 of the saw arm 407. The curtain 402 is configured to receive rod 404. For example, as shown in FIG. 4, the curtain 402 can have a plurality of flaps 409 disposed at one end of the curtain 402, and each flap 409 can have a hole therethrough configured to receive the rod 404. The saw arm 407 has brackets 408 attached thereto that are configured to receive and maintain the rod 404. As shown in FIG. 4, for example, the curtain 402 can be disposed from the saw arm 407 (about the rod 404) in a substantially vertical plane rearward of the cutting area and extending from a first side of the saw 400 to a second side of the saw 400. In certain embodiments, such as the embodiment shown in FIG. 4, for example, providing a curtain in a substantially vertical plane rearward of the cutting area and extending from a first side of a saw 400 to a second side of the saw 400 can reduce the amount of dust and/or mist that is dispelled into the area surrounding the saw during a cutting operation. In certain embodiments, providing a curtain in a substantially vertical plane on a side of the cutting area can reduce the amount of dust and/or mist that is dispelled into the area surrounding the saw during a cutting operation. In certain embodiments, curtain 402 can be made of rubber, plastic and/or other material(s) that is/are suitable for blocking dust and/or mist created during a cutting operation.

Figure 7:
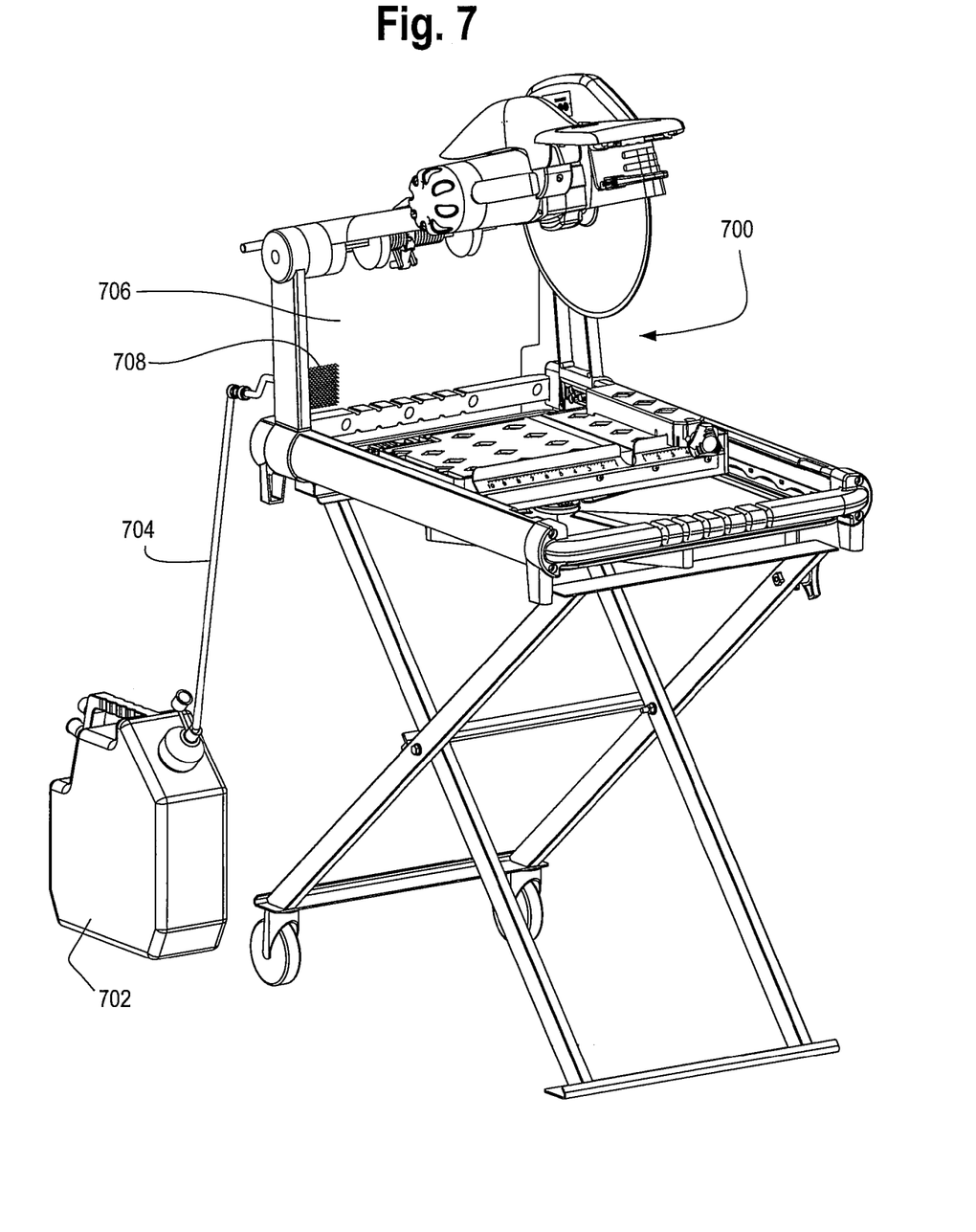
FIG. 7 is a side perspective view of a saw assembly used in accordance with an embodiment of the present technology.

FIG. 7 is a side perspective view of a saw assembly 700 used in accordance with an embodiment of the present technology. The saw assembly includes a fluid source 702, a fluid conduit 704 that can deliver fluid from the fluid source 702 to a pump (not shown), and a curtain 706 with a plurality of protrusions 708 that extend outwardly from the surface of the curtain. As shown in FIG. 7, the plurality of protrusions 708 cover a portion of the curtain, however, in certain embodiments, protrusions can cover substantially all of a surface of a curtain. As described below in connection with FIG. 8, a curtain with protrusions can provide enhanced fluid and/or dust containment, when compared to a planar curtain.

Figure 8:
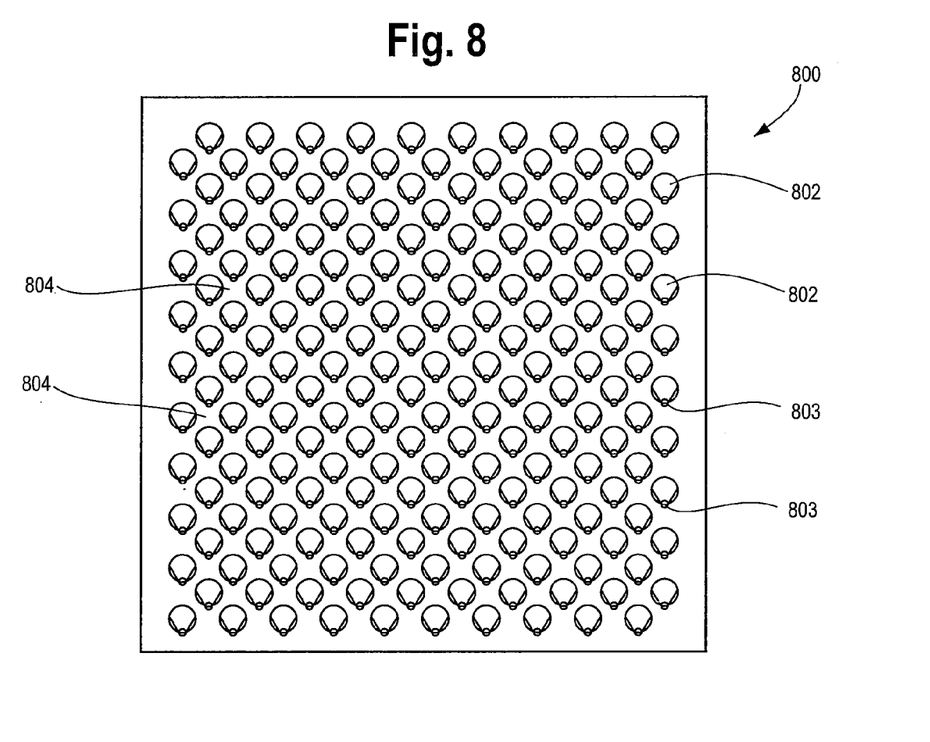
FIG. 8 is a perspective view of a portion of a curtain used in accordance with an embodiment of the present technology.

FIG. 8 is a perspective view of a portion of a curtain 800 used in accordance with an embodiment of the present technology. The portion of the curtain 800 includes a plurality of protrusions 802 with spaces 804 therebetween. In the embodiment shown, the protrusions 802 are conical with the narrow end 803 of each protrusion 802 projecting outward from the curtain. In certain embodiments, protrusions that extend outwardly from the surface of a curtain can be cylindrical or polygonal, for example. In certain embodiments, protrusions that extend outwardly from the surface of a curtain can be other shapes. A curtain with protrusions that extend outwardly from the surface of the curtain can be disposed on a cutting apparatus (as shown, for example, in FIG. 7) such that the protrusions face a cutting area. In such an embodiment, the protrusions can catch fluid dispelled from a nozzle and/or dust particles produced during a cutting operation. A curtain with protrusions can provide enhanced fluid and/or dust containment, when compared to a planar curtain, for example, by catching the fluid and/or dust in the spaces between the protrusions and on the surface of the protrusions.

Figure 9:
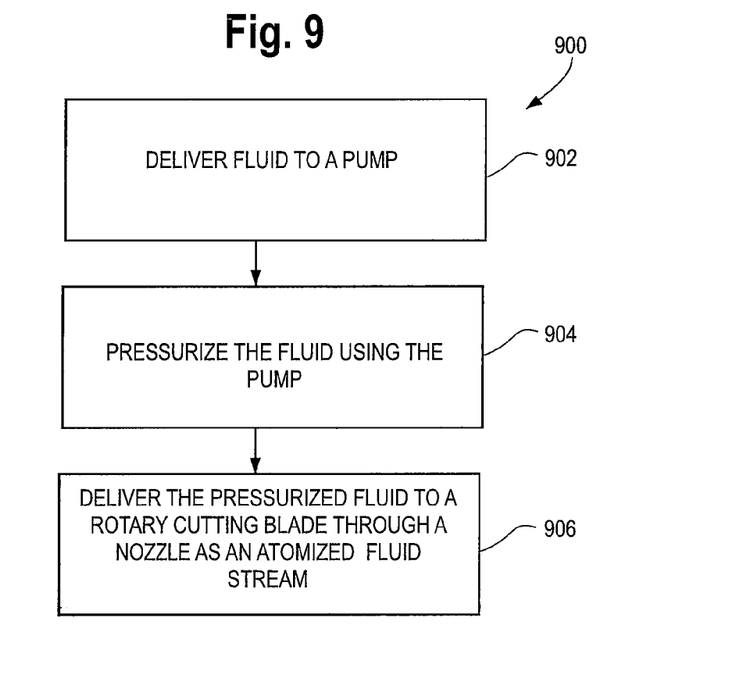
FIG. 9 illustrates a method for delivering fluid to a rotary cutting blade used in accordance with an embodiment of the present technology.

FIG. 9 illustrates a method for delivering fluid to a rotary cutting blade used in accordance with an embodiment of the present technology. At 902, fluid is delivered to a pump. For example, in certain embodiments, water contained in a tank can be delivered to a pump via a fluid conduit that runs from the tank to the pump. At 904, the fluid is pressurized using the pump. For example, in certain embodiments, the pump can be configured to pressurize fluid to 55 pounds per square inch. At 906, pressurized fluid is delivered to the blade through a nozzle as an atomized fluid stream. For example, in certain embodiments, pressurized fluid can be delivered to a nozzle via a fluid conduit that runs between the pump and the nozzle. In certain embodiments, the nozzle can dispel fluid through an opening that is, for example, 0.012 inches in diameter.

In certain embodiments, a method for delivering fluid to a rotary cutting blade can include, for example, containing fluid delivered through the nozzle and dust created during a cutting operation by disposing a curtain with a plurality of protrusions extending therefrom adjacent to the cutting operation. In certain embodiments, a method for delivering fluid to a rotary cutting blade can include, for example, filtering particulate matter from the pressurized fluid before delivering the pressurized fluid to the nozzle. In certain embodiments, delivering pressurized fluid to the blade can include, for example, delivering pressurized fluid via a fluid conduit. In certain embodiments, delivering pressurized fluid to the blade can include, for example, delivering pressurized fluid via a fluid conduit that comprises a manifold. In such embodiments, fluid can be circulated through the manifold to a nozzle that is attached to the manifold, and then delivered through the nozzle to the blade. In certain embodiments, delivering pressurized fluid to the blade can include, for example, delivering pressurized fluid via a fluid conduit that comprises a tube and an elbow fitting. In such embodiments, fluid can be circulated through the tube and the elbow fitting to a nozzle that is attached to the elbow fitting, and then delivered through the nozzle to the blade. In certain embodiments, a method for delivering fluid to a rotary cutting blade can include, for example, delivering pressurized fluid to the blade when a switch that controls whether power is delivered to the pump is in an on position; and not delivering the pressurized fluid to the blade when the switch is in an off position.

Applying the method 900 as described above, and/or in light of the embodiments described in connection with FIGS. 1-8, can reduce dust without creating excessive amounts of waste material, thereby reducing environmental hazards and improving operator safety. Further, applying the method 900 as described above, and/or in light of the embodiments described in connection with FIGS. 1-9 can cool a cutting blade, reduce blade wear and/or increase productivity by reducing clean-up time.

While the invention has been described with reference to embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system for delivering pressurized fluid to a rotary cutting blade comprising:
   a pump configured to receive fluid from a fluid source and pressurize the fluid;
   a nozzle configured to receive the pressurized fluid and deliver the pressurized fluid to a rotary cutting blade as an atomized fluid stream, wherein the pump pressurizes the fluid to a pressure sufficient to cause the fluid to be atomized when the fluid is passed through the nozzle; and
   a curtain comprising a first side with a plurality of protrusions extending therefrom such that the protrusions project outward from the first side of the curtain, wherein the curtain is disposed on a cutting apparatus such that the first side faces a cutting area, wherein said protrusions cover substantially all of the first side surface.

2. The system of claim 1, further comprising:
   a fluid conduit configured to receive the pressurized fluid from the pump and deliver the pressurized fluid to the nozzle, wherein the fluid conduit comprises an elbow fitting to which the nozzle is attachable.

3. The system of claim 2, wherein the elbow fitting is configured to receive a threaded end of the nozzle.

4. The system of claim 2, wherein the elbow fitting is configured to be attached to a cover disposed on a blade housing about a narrow end of the blade housing.

5. The system of claim 1, further comprising:
   a fluid conduit configured to receive the pressurized fluid from the pump and deliver the pressurized fluid to the nozzle, wherein the fluid conduit comprises a manifold to which the nozzle is attachable.

6. The system of claim 5, wherein the manifold is u-shaped and disposed on a blade housing about a narrow end of the blade housing.

7. The system of claim 5, wherein the manifold comprises an upper portion, a lower portion and a gasket between the upper portion and the lower portion.

8. The system of claim 1, wherein the nozzle includes an opening through which fluid can pass, and wherein the opening has a diameter between about 0.006 inches and about 0.020 inches.

9. The system of claim 8, wherein the opening has a diameter of about 0.012 inches.

10. The system of claim 1, wherein the pump is configured to pressurize the fluid to about 55 pounds per square inch.

11. The system of claim 1, further comprising:
a switch operably connected to the pump, wherein the switch has a first position and a second position, wherein the pressurized fluid is delivered to the nozzle when the switch is in the first position and the pressurized fluid is not delivered to the nozzle when the switch is in the second position.

12. The system of claim 1, wherein the pump and nozzle are configured to provide dust containment by directing the atomized fluid stream toward the blade in a direction that is substantially perpendicular to a plane of rotation of the rotary cutting blade.

13. The system of claim 1, wherein the protrusions are separated by spaces, and wherein the curtain is configured such that debris from the cutting operation can be caught in the spaces and on the protrusions.

* * * * *